Dec. 31, 1957    W. PEDDINGHAUS ET AL    2,818,114
GUILLOTINES FOR STEEL SECTIONS WITH AUTOMATICALLY
MOVING STEEL SECTION KNIVES
Filed May 27, 1954
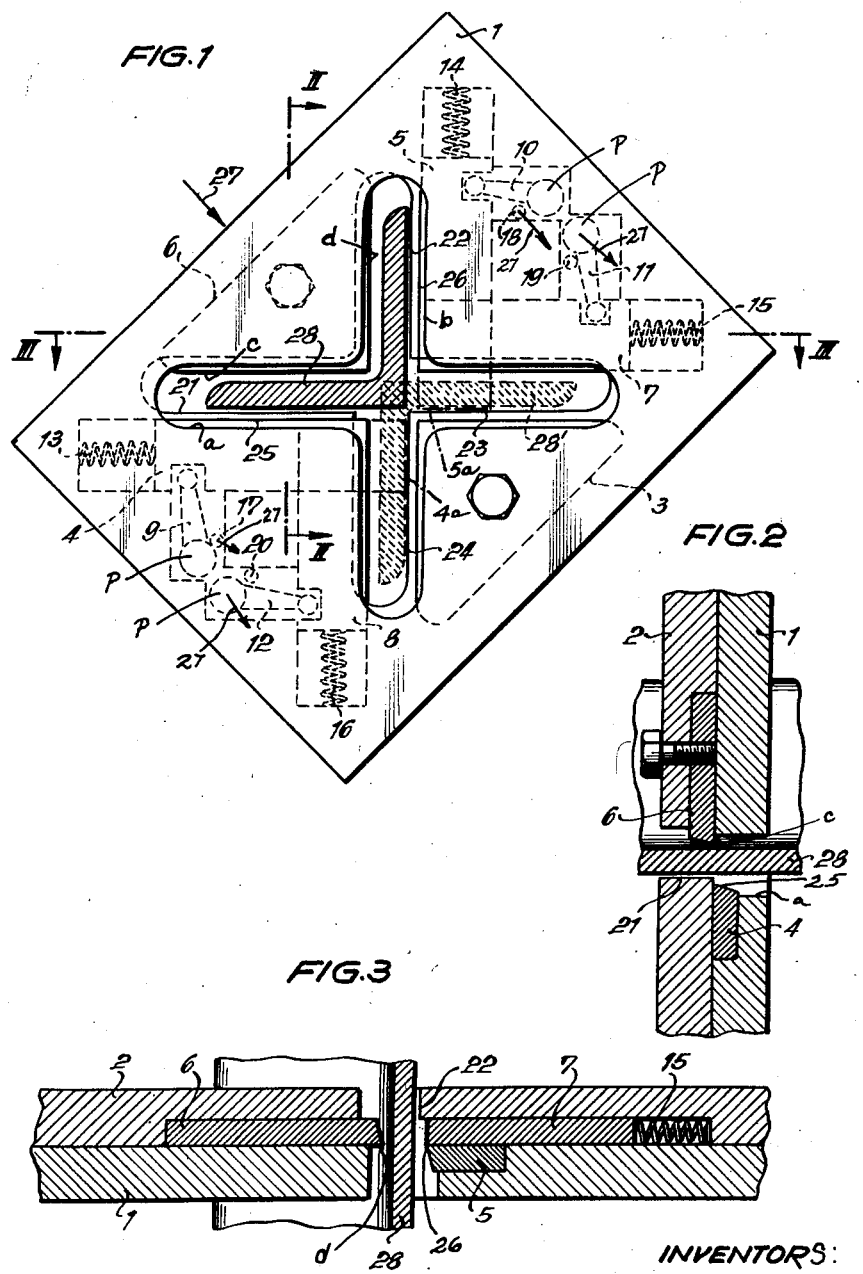
INVENTORS:
WERNER PEDDINGHAUS AND
EMIL FUNKE
BY:

United States Patent Office
2,818,114
Patented Dec. 31, 1957

2,818,114

GUILLOTINES FOR STEEL SECTIONS WITH AUTOMATICALLY MOVING STEEL SECTION KNIVES

Werner Peddinghaus and Emil Funke, Gevelsberg, Germany

Application May 27, 1954, Serial No. 432,818

Claims priority, application Germany June 11, 1953

4 Claims. (Cl. 164—40)

The invention relates to guillotines for steel sections, with automatically moving steel section knives.

High-class guillotines for profile steel sections are preferably equipped with automatically working, or moving, steel section knives which thus obviate any manual displacing of the section stock. Such steel section guillotines are operated so that the steel section stock is inserted into the cruciform knife profile, the machine is started, and the moving knives first move automatically up to the section, and only then does cutting take place. Thus, the section lies on the automatically advancing knife. The heavier the profile stock, the more difficult becomes the displacing movement of the knife, since obviously the weight of the profile stock hinders the advancing of the knife. But this disadvantage is met with even when lighter, smaller section stock is to be cut, when the holding-down device is pressed firmly down on the stock to be cut.

The above mentioned disadvantage has been overcome by using particularly strong springs ensuring the free movement of the knives. These stronger springs, however, have in turn the disadvantage that the retracting lever has to use much greater forces than hitherto in retracting the knives. These superior forces impede the idling of the machine on the return stroke quite considerably and require substantially stronger automatic working elements.

The present invention overcomes the disadvantages mentioned above by setting off by a certain distance the two cutting orifices, which are generally cruciform, in the two knife carriers, in respect to each other. Accordingly, in the non-operative position, the non-cutting edges of the cutting cross of the movable knife carrier protrude beyond the cutting edges of the stationary knife carrier by an accurately determined distance. The section stock to be cut is placed on these protruding, non-cutting edges. The cutting knife edges, or the automatically moving shear knives respectively, are thus exposed and can shoot forward into the working or cutting position when the working stroke starts. Then only the cutting stroke proper is taken.

The drawing illustrates one example of an embodiment of the invention, in which:

Fig. 1 is a total view of the profile knives,

Fig. 2 is a vertical section on the line II—II, and

Fig. 3 is a horizontal section on the line III—III in Fig. 1.

Referring now to the drawing, there is shown a preferred embodiment of a cutting arrangement according to the present invention which includes a stationary carrier 1 formed with a cross-shaped cutout portion. The carrier 1 carries three knives or cutting means 3, 4 and 5. The knife 4, the upper edge 25 of which is viewed in Figure 1, is a cutting edge, is movable from left to right and is biased rightwardly by the spring 13; the knife 5, the left-hand edge 26 of which is a cutting edge is movable up and down and is biased downwardly by the spring 14; and the triangular knife 3 is stationary relative to the carrier 1 and has two cutting edges which protrude beyond the edges of the cutout portion of the carrier 1.

A movable carrier 2 is arranged adjacent the carrier 1 and is movable relative thereto in the direction of the arrows 27. The carrier 2 is also provided with three knives 6, 7 and 8 which correspond, respectively, to the knives 3, 4, 5 carried by the carrier 1. Thus, the knives 7 and 8 are mounted for movement relative to the carrier 2 and the knife 6 is fixedly secured thereto.

The parts are shown in Figure 1 in an inoperative position wherein the cutting edge 25 of the knife 4 protrudes beyond the edge $a$ of the cutout portion of the carrier 1 and the cutting edge 26 of the knife 5 protrudes beyond the edge $b$. These cutting edges are adapted to cooperate with the cutting edges $c$ and $d$ respectively, of the knife 6. When the carriers 1 and 2 are in their inoperative position, the edges 21 and 22 of the cutout portion of the carrier 2 protrude beyond the cutting edges 25 and 26 respectively, so that when the work piece 28, shown as being substantially L-shaped is extended through the cutout portions of both carriers, this work piece will not rest on or abut against the cutting edges 25 and 26 but will instead rest on or abut against the edges 21 and 22 of the carrier 2. As a result, horizontal movement of the knife 4 and vertical movement of the knife 5 is not braked or retarded, as would be the case if the work piece 28 were to rest on or abut against the cutting edges 25 and 26, respectively.

The arrangement of the parts is such that when the movable carrier 2 is moved in the direction of the arrows 27 into an operative position, the edges 21 and 22 will recede behind the edges 25 and 26 so that the work piece 28 will engage these cutting edges 25 and 26. However, before the edges 21 and 22 are flush with the edges 25 and 26, respectively, the knife 4 will have moved rightwardly into the position shown in dotted lines at 4a and the knife 5 will have moved downwardly into an analogous position shown at 5a.

The mechanism which brings about this movement of the knives may readily be seen from the drawing. Considering only the mechanism associated with the knives 4 and 5, the same includes levers 9 and 10 which are mounted on the carrier 1 for pivotal movement about pivot points $p$. The pins or lugs 17 and 18, on the other hand, are mounted on the carrier 2 so that when this carrier 2 moves in the direction of the arrows 27, the pins or lugs 17 will also move in the same direction, as shown by the arrows emanating therefrom. Since the knife 4 is biased for rightward movement by the spring 13, the lever 9 will be rotated in a clockwise direction since the lug 17 will no longer be in a position to prevent such turning movement of the lever 9. Similarly, the knife 5 is biased for downward movement by spring 14 and the lever 10 will be free to rotate in a counter-clockwise direction.

As set forth above, the rightward movement of the knife 4 and the downward movement of the knife 5 will have been completed by the time the work piece 28 contacts the cutting edges 25 and 26.

As the carrier plate 2 continues to move in the direction of the arrows 27, the cutting edges $c$ and $d$ of knife 6 will be brought to bear against the work piece 28, and the same will be subjected to shearing or cutting action between the cooperating edges 25, $c$ and 26, $d$.

During this operation, the knife 8 will move upwardly and the knife 7 leftwardly until they engage the work piece 28. However, insofar as the work piece 28 shown in Figure 1 is concerned, the knives 7 and 8 do not act as cutters but simply urge the work piece toward the knife 6, depending upon the strength of the springs 15 and 16 and the weight of the work piece. Of course, if the work piece to be cut had been inserted as shown in dotted lines at 28; it would rest on the edges 23 and 24 and consequently not interfere with the sliding movement of the knives 7 and 8. These knives would then cooperate with the knife 3 in a manner completely analogous to the manner in which the knives 4 and 5 cooperate with the knife 6 in the above illustration.

Moreover, it will be clear that if the work piece has an X-shaped configuration, all of the knives would simultaneously act as cutting means. Similarly, a work piece of T-shaped configuration can easily be accommodated within the cutout portions of the carriers 1 and 2 and the appropriate knives would act as cutters.

Still in connection with the knives 7 and 8, it will be seen that the mechanism which causes their movement includes the levers 11 and 12 which are pivotally mounted on the carrier 2 and lugs 19 and 20 which are mounted on the carrier 1, so that when the carrier 2 moves in the direction of the arrows 27, the levers 11 and 12 will move away from the lugs 19 and 20 so that the lever 11 may freely pivot in a clockwise direction and the lever 12 may freely pivot in a counter-clockwise direction, thus permitting the left-ward and upward movement of the knives 7 and 8 respectively.

It will be readily understood from the above that inasmuch as the cutout portions are not blocked by any of the cutting knives when the carriers are in partially aligned position, the work piece may very easily be introduced or extended through these cutout portions. On the other hand, the knives occupy their forward or working position after the work piece has been put into place. Consequently, the knives must be freely movable into their working position, and in order to make this possible the work piece should not engage the knives until the same are in their working position. This is achieved by a cutting device according to the present invention wherein when the carriers 1 and 2 are in their inoperative position a work piece to be cut may be extended through both of the cutout portions without engaging the cutting edges of the movable knives, whereas when the cutter carriers are properly actuated, these cutting edges will be brought into engagement with the work piece to be cut.

It will be understood that each of the elements described above, or two or more together, may also find a useful application in other types of cutting devices differing from the types described above.

While the invention has been illustrated and described as embodied in a cutting device for cutting steel sections, it is not intended to be limited to the details shown, since various modifications and structural changes may be made without departing in any way from the spirit of the present invention.

We claim:

1. In a cutting device, in combination, first and second cutter carriers mounted for movement relative to each other along a predetermined path, said cutter carriers being formed, respectively, with substantially similar first and second cutout portions so that when said cutout portions are in at least partial alignment with each other a work piece to be cut may extend through both of said cutout portions; at least one first cutting means on said first cutter carrier in the region of said first cutout portion thereof; at least one second cutting means on said second cutter carrier in the region of said second cutout portion thereof and adapted to cooperate with said first cutting means when said cutter carriers are moved relative to each other along said path in that direction in which said first and second cutting means move toward each other, said second cutting means having a cutting edge protruding beyond an edge of said second cutout portion of said second cutter carrier in a direction opposite to said direction, said second cutting means also being movable relative to said second cutter carrier in a sense transverse to said direction; and moving means for moving said cutter carriers relative to each other along said path in said direction from an inoperative position wherein said cutout portions are partially in alignment with each other but wherein that edge of said first cutout portion of said first cutter carrier which corresponds to said edge of said second cutout portion of said second cutter carrier is spaced from said cutting edge of said second cutting means in said opposite direction, whereby when said cutter carriers are in said inoperative position a work piece to be cut may be extended through both of said cutout portions of said cutter carriers without engaging said cutting edge of said second cutting means thereby permitting said second cutting means freely to move in said transverse direction, and when said cutter carriers are moved along said path in said direction the work piece will be engaged by said cutting edge of said second cutting means.

2. In a cutting device, in combination, first and second cutter carriers mounted for movement relative to each other along a predetermined path, said cutter carriers being formed, respectively, with substantially similar first and second cutout portions at least a part of each of which has a L-shaped configuration so that when said cutout portions are in at least partial alignment with each other a work piece to be cut may extend through both of said cutout portions; at least one first cutting means on said first cutter carrier in the region of said first cutout portion thereof; at least one second cutting means on said second cutter carrier in the region of said second cutout portion thereof and adapted to cooperate with said first cutting means when said cutter carriers are moved relative to each other along said path in that direction in which said first and second cutting means move toward each other, said second cutting means having a cutting edge overlapping beyond an edge of one leg portion of said second cutout portion of said second cutter carrier in a direction opposite to said direction; mounting means for mounting said second cutting means for movement relative to said second cutter carrier in a sense transverse to said direction between a retracted position wherein said second cutting means is spaced from the other leg portion of said second cutout portion and a forward position wherein said second cutting means overlaps said other leg portion; moving means for moving said cutter carriers relative to each other along said path in said direction from an inoperative position wherein said cutout portions are partially in alignment with each other but wherein that edge of said first cutout portion of said first cutter carrier which corresponds to said edge of said second cutout portion of said second cutter carrier is spaced from said cutting edge of said second cutting means in said opposite direction; and positioning means connected to said second cutting means and to said moving means for holding the former in said retracted position thereof when said cutter carriers are in said inoperative position and for moving said second cutting means into said forward position thereof while said moving means moves said cutter carriers in said opposite direction but before said moving means has moved said cutter carriers out of said inoperative position, whereby when said cutter carriers are in said inoperative position a work piece of L-shaped cross-sectional configuration may be extended through both of said cutout portions of said cutter carriers without engaging said cutting edge of said second cutting means thereby permitting said positioning means freely to move said second cutting means in said transverse sense, and when said cutter carriers are moved along said path in said direction said positioning means will move said second cutting means into said forward position thereof so that after said cutter carriers have been moved out of said inoperative position the work piece will be engaged by said cutting edge of said second cutting means while the same overlaps both leg portions of said second cutout portion of said second cutter carrier.

3. The combination defined in claim 2 wherein each of said first and second cutout portions has a X-shaped configuration.

4. The combination defined in claim 2 wherein said positioning means includes biasing means for urging said second cutting means into said forward position thereof.

References Cited in the file of this patent

UNITED STATES PATENTS

| | | |
|---|---|---|
| 1,309,848 | Gabriel | July 15, 1919 |
| 1,497,676 | Fink | June 17, 1924 |
| 1,902,604 | Winter | Mar. 21, 1933 |
| 2,644,520 | Nelson | July 7, 1953 |

FOREIGN PATENTS

| | | |
|---|---|---|
| 253,388 | Germany | Nov. 7, 1912 |
| 451,563 | Germany | Nov. 1, 1927 |
| 631,825 | Germany | June 27, 1936 |